Sheet. 2.

Witnesses,
Wm A Steel,
Jno. B. Harding.

John Walker
by his Attys
Howson and Son

United States Patent Office.

JOHN WALKER, OF PHILADELPHIA, PENNSYLVANIA.

Letters Patent No. 112,097, dated February 21, 1871.

IMPROVEMENT IN PROPORTIONAL SCALES FOR THE CONSTRUCTION OF TOOTHED GEAR.

The Schedule referred to in these Letters Patent and making part of the same.

I, JOHN WALKER, a subject of the Queen of Great Britain and Ireland, at present residing in Philadelphia, county of Philadelphia, State of Pennsylvania, have invented a Scale for Cog-Wheels, Racks, &c., of which the following is a specification.

Nature and Object of the Invention.

My invention consists of a scale, fully explained hereafter, for readily and quickly determining the size and shape of the teeth of all kinds of cog-wheels, racks, worms, &c., without any of the tedious calculations which are usually required in this class of work.

Description of the Accompanying Drawing.

Figure 1:
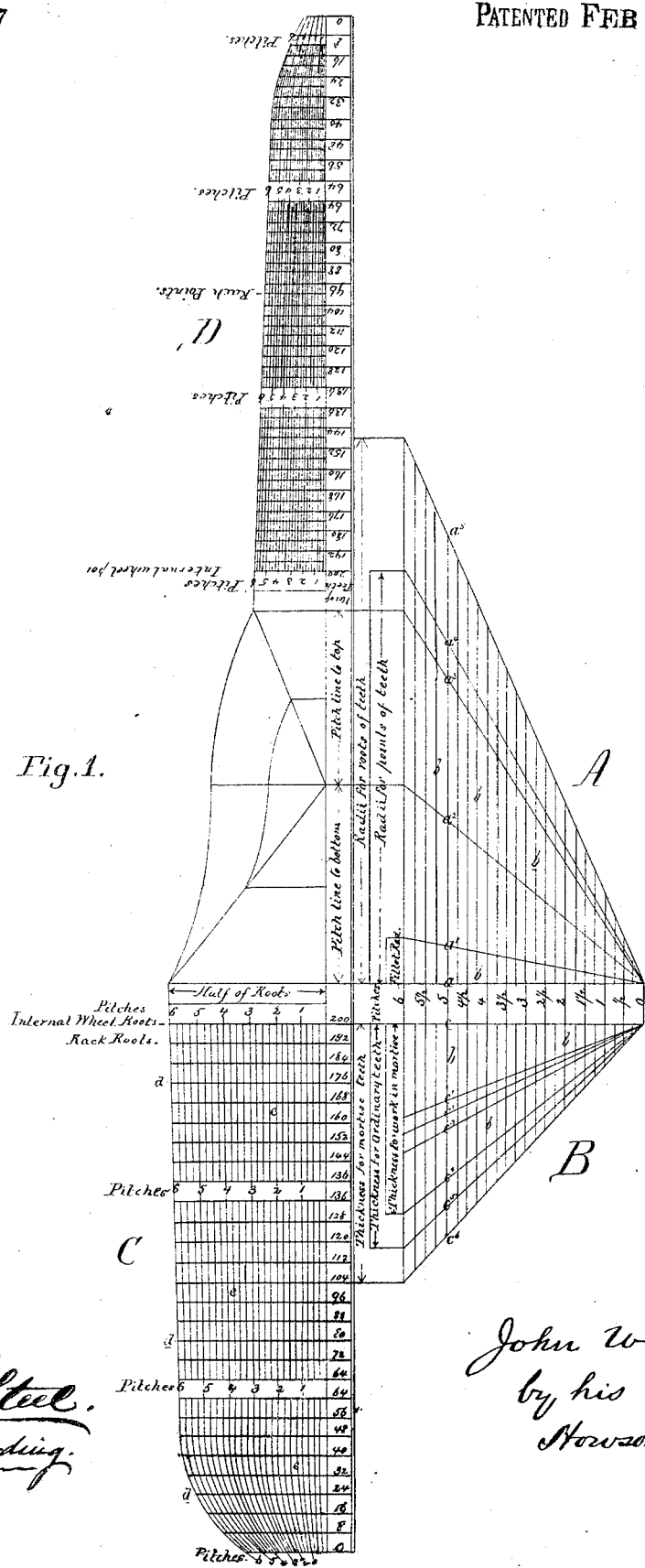
Figure 2:
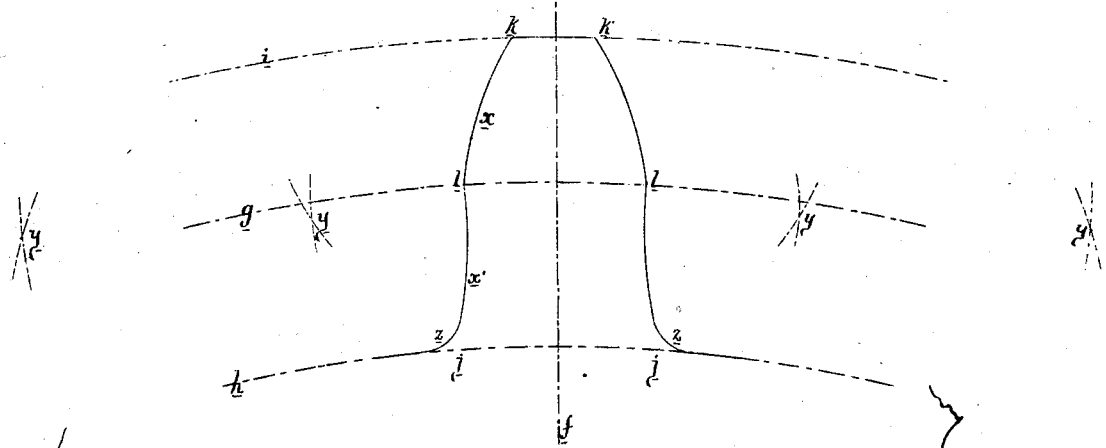
Figures 3, 4:
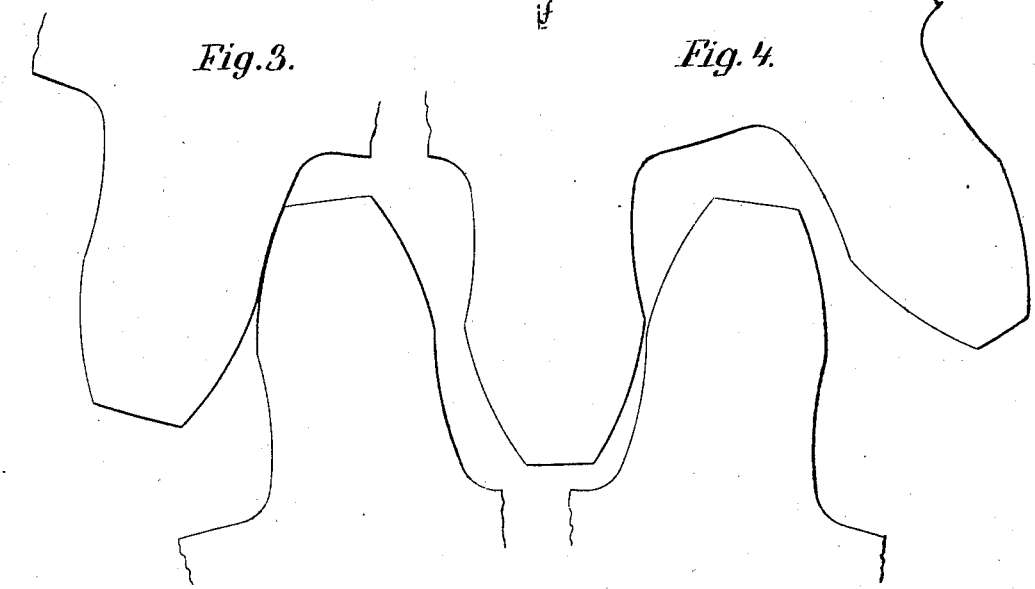

Figure 1, sheet 1, is a view of my scale for cog-wheels, racks, &c., drawn one-third less than full size;

Figure 2, sheet 2, a diagram illustrating the method of designing a cog-wheel tooth from the scale;

Figure 3, a view of a portion of two cog-wheels of the same diameter, geared together and having teeth designed from the scale;

Figure 4, a view of a portion of two cog-wheels of different diameters; and

Figure 5:
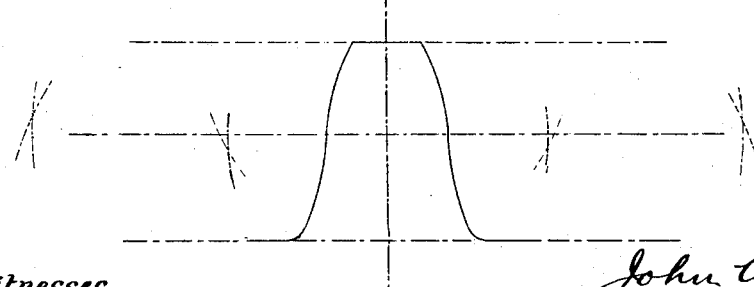

Figure 5, a diagram showing the method of using the scale in designing the teeth of racks and of worms for worm-wheels.

General Description.

The cog-teeth represented in sheet 2 of the drawing are of the kind which it is designed to produce by the scale, they being of what is commonly known as the ogee pattern; or, in other words, their working edges are formed on two curves or parts of circles, an outwardly-rounding curve, $x$, fig. 2, from the point of the tooth to the pitch-line, and an inwardly-rounding curve, $x'$, from the pitch-line to the root of the tooth.

Wheels having teeth of this pattern work together with little friction, and have several other advantages which will be more particularly referred to hereafter.

By means of the scale the most advantageous curves for the working edges of any tooth of a given pitch, as well as the length of the tooth, and other data which have usually been obtained by tedious calculations, can be readily determined.

The complete scale is illustrated in fig. 1, and consists of four main parts, each of which forms in itself a scale for determining certain points.

The portion A of the scale is of a triangular shape, and consists of lines $a$ $a'$ $a^2$, &c., converging toward a single point, and intersected by parallel lines $b$, on which are marked the "pitches," from one-quarter of an inch to six inches.

The portion B of the scale is directly opposite and similar to the portion A, and consists of converging lines $c$ $c'$ $c^2$, &c., which cross the parallel pitch-lines $b$.

The third portion C of the scale is for determining the width of the roots of the teeth, and is made up of parallel lines $d$, upon which are marked numbers from 0 to 200, indicating numbers of teeth in different wheels, and of converging lines $e$, crossing the lines $d$, and curved at the ends where they most nearly approach each other. The lines $e$ are marked with numbers from 0 to 6, indicating different pitches.

The fourth division D of the scale is for determining the proper width of the points of teeth, and is precisely similar to the above-described portion C, except that it is narrower throughout.

In order to explain the method of using the scale, let it be supposed that the shape of the teeth of a wheel of eleven and one-half inches radius, and to have twenty-four teeth of three-inch pitch, is to be determined.

The radius line $f$ and curved pitch-line $g$, on the radius of eleven and one-half inches, are first drawn as shown in fig. 2. Then, with a pair of compasses, the distance on the division A of the scale, from the line $a$ to the line $a^2$, on the pitch-line 3, is taken and transferred to the drawing to determine the position of the curved root line $h$, which is drawn as shown.

The curved line $i$ for the points of the teeth is next determined and drawn in a similar manner by measuring the distance on the scale between the lines $a^2$ and $a^3$ on the same pitch-line 3.

The width of the tooth at the root is next ascertained by measuring with the compasses, on the division C of the scale, the distance on the line 24, (the number of teeth of proposed wheel,) between the pitch lines 0 and 3.

This measurement is laid off on each side of the radius $f$ upon the root line $h$, the points being marked $j$ in the drawing.

The width of the tooth at the point is ascertained in a similar manner from the division D of the scale, and is laid to the points $k$ $k$ upon the line $i$.

For the width of the tooth at the pitch line a measurement is taken on the division B of the scale, between the lines $c$ and $c^2$, on the pitch line 3, and this is laid off on either side of the radius to obtain the points $l$ $l$.

The length of the tooth and the points $j$, $k$, and $l$, marking its width, having been thus ascertained, it only remains to determine the proper curves for the lines $x$ and $x'$, the radiuses for striking which are to be found upon the division A of the scale.

The radius for the line $x$ is found by measuring, upon the pitch line 3, the distance between the lines $a$ and $a^4$, and the radius for the line $x'$ by measuring, upon the same pitch-line, the distance between the lines $a$ and $a^2$.

These measurements are transferred to the drawing, and the curves $x$ and $x'$ drawn, the proper centers being found, if thought necessary, by means of the radiuses $y\ y\ y$, &c., indicated in dotted lines.

The proper curve for the fillets $z$, at the root of the tooth, can be determined by measuring the distance between the lines $a$ and $a^1$ on the pitch line 3 of the division A, which will give the radius.

In calculating for teeth of a different pitch from that above described, a pitch of two inches, for instance, all measurements would be made upon the pitch-line 2, in the different divisions of the scale, or upon any other line, according to the pitch determined upon.

Fig. 3 illustrates a portion of two cog-wheels of the same diameter geared together, and having teeth designed from the scale in the manner above described; and fig. 4 illustrates portions of two cog-wheels of different diameters, the teeth of which are also designed from the scale.

In fig. 5 a rack-tooth is shown. This is designed from the scale in the same manner as the wheel-teeth, except that upon the divisions C and D of the scale all measurements are made upon one line, as indicated, there being no limit to the number of teeth.

The measurements for worms to gear into worm-wheels are determined in the same manner as for racks, and for internal cog-wheels all the measurements upon the divisions C and D are likewise made upon a single line, as shown.

In ascertaining the measurements for the teeth of mortise-wheels, and of wheels to gear into the same, the same course is adopted as with ordinary cog-teeth, except that in the division B of the scale measurements are made to the lines $c^1$ and $c^1$, instead of to the line $c^2$, as before described.

Among the advantages arising from the employment of the scale may be mentioned the following:

The teeth of wheels calculated from the scale will work pitch-line to pitch-line, and with comparatively little friction.

All wheels calculated from the scale and of the same pitch will be interchangeable; for instance, a pinion of twelve teeth will work into another pinion of the same number of teeth, or with a wheel having any greater number of teeth, or any cog-wheel or pinion will gear properly with a rack or internal cog-wheel of the same pitch.

No templets will in any case be required, and in preparing patterns for wheels it will only be necessary to construct one tooth upon the drawing-board.

Claim.

The scale, consisting of the divisions A, B, C, and D, their letters and numerals, and lines $a\ a^1$, &c., $b$, $c$ $c^1$, &c., $d$ and $e$, the whole being constructed and arranged as set forth.

In testimony whereof I have signed my name to this specification in the presence of two subscribing witnesses.

JOHN WALKER.

Witnesses:
 WM. A. STEEL,
 JNO. B. HARDING.